(No Model.)
D. W. GLIDDEN.
VEHICLE SPRING.
No. 425,029. Patented Apr. 8, 1890.
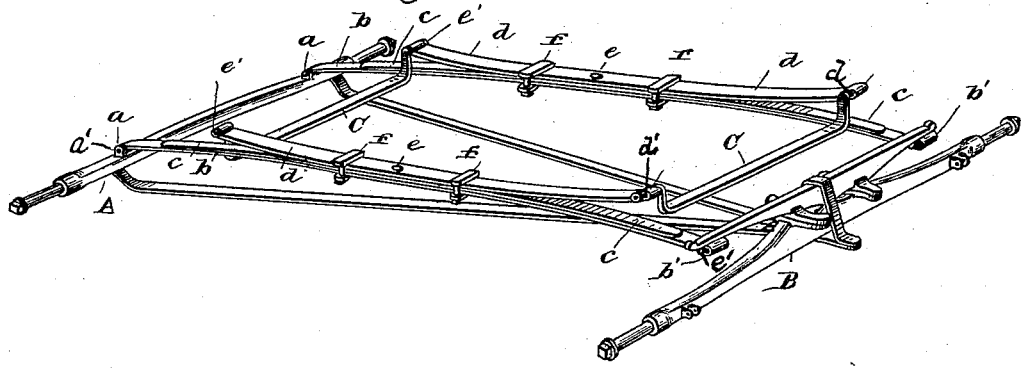
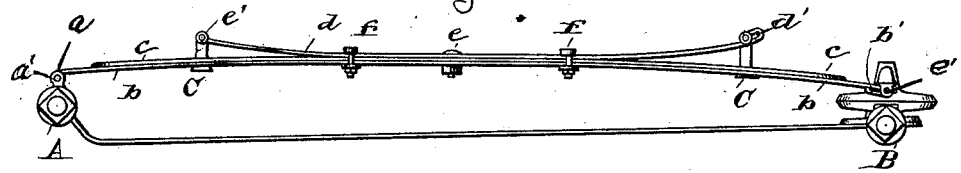
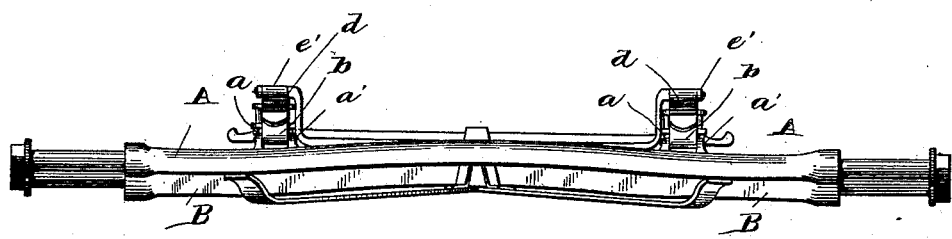
Witnesses
H. D. Nealy
T. P. Davis
Inventor
David W. Glidden
By his Attorney
R. G. DuBois

UNITED STATES PATENT OFFICE.

DAVID W. GLIDDEN, OF MONTROSE, PENNSYLVANIA.

VEHICLE-SPRING.

SPECIFICATION forming part of Letters Patent No. 425,029, dated April 8, 1890.

Application filed November 12, 1889. Serial No. 329,975. (No model.)

*To all whom it may concern:*

Be it known that I, DAVID W. GLIDDEN, a citizen of the United States, residing at Montrose, in the county of Susquehanna and State of Pennsylvania, have invented certain new and useful Improvements in Vehicle-Springs; and I do hereby declare the following to be a full, clear, and exact description of the invention, such as will enable others skilled in the art to which it appertains to make and use the same.

My invention relates to vehicle-springs, and more especially to side springs for four-wheeled vehicles; and my object is to produce an exceedingly light spring which will at the same time sustain a very heavy load.

With this end in view my invention consists in the peculiar features and combinations of parts more fully described hereinafter, and pointed out in the claims.

Referring to the accompanying drawings, Figure 1 is a perspective view of the running-gear of a four-wheeled vehicle having my improved spring applied thereto; Fig. 2, a side elevation of the same, and Fig. 3 an end view.

Reference-letter A indicates the rear axle of the vehicle, which is provided on its upper surface with ears or lugs $a$, between which the rear ends of the lower leaves $b$ of the springs are journaled by means of pins $a'$, around which the leaves are turned. These leaves $b$ are similarly attached to the lower side of the front bar B, but are provided at their forward ends with elongated slots or loops $b'$, thus affording endwise play of the spring on the pins $e'$, for a purpose explained hereinafter. The second leaf $c$ is applied in the usual manner, and on top of this leaf is secured the top leaf $d$, which is shorter than leaf $c$, and is placed back to back therewith, so that its ends extend upward away from the lower part of the spring. These three leaves are secured together by the bolt $e$ in the center and clips $f$, which are made adjustable, so that the spring can be stiffened or limbered up, as desired, by moving the clips farther away or nearer the center or bolt $e$, thus binding a greater or less part of the leaves together.

The body-supports consist of bent rods C, which are secured to the body-bottom and journaled or pivoted at either end in the top leaves $d$ of the springs. The forward ends of these leaves $d$ are provided with elongated slots or loops $d'$, in which the forward hanger is journaled, and thus the leaf is allowed slight endwise play in the same manner as the lower leaf $b$.

The action of this spring is as follows: When a single person is riding, the resiliency will be entirely supplied by the single top leaf $d$, thus rendering the vehicle a very easy-riding one for one person. Now, when more weight is added the upper leaf will be borne down upon the leaf $c$ and lie contiguous therewith, whereby the three leaves will form one spring, and will brace each other in such a manner as to render a breakage almost impossible. The elongated loops in the top and bottom leaves serve to equalize the pressure and take the place of the ordinary links, allowing the spring to lengthen and shorten, and greatly reducing the strain upon the bearing, as free action is thereby given the springs. The principal advantage of my arrangement, however, is that it will readily sustain fully twice as heavy a load as an ordinary side spring of the same weight. This is made possible by the fact that the upper reversed spring $d$ is pivotally connected to the body-supporting hangers, and thus when a light weight, as that of one person, is to be carried it is wholly borne by the top spring, and when additional weight is added the top leaf will be brought to lie upon the lower leaves, when a three-leaved spring will be formed and as much more weight can be added to that already carried as any ordinary three-leaved spring will stand. It will thus be observed that a very large load can be carried, while the spring retains the lightness of a common three-leaved spring.

It is evident that various changes in the construction and arrangement of parts of my invention which might suggest themselves to a skilled mechanic could be resorted to without departing from the spirit and scope of my invention; hence I do not limit myself to the precise construction shown; but,

Having thus described my invention, what I claim as new, and desire to secure by Letters Patent, is—

1. In a vehicle, the combination, with a pair of side springs, each consisting of a lower portion consisting of two or more leaves, and an upper portion having more resiliency than said lower portion and rigidly secured thereto and diverging therefrom, of hangers connected to the ends of said upper portions of said springs and pivotally hung therefrom, and the vehicle-body rigidly secured to said hangers and not otherwise connected to said springs, in the manner and for the purpose substantially as described.

2. In a vehicle, the combination, with a pair of side springs, each consisting of a lower portion formed of two or more leaves, and an upper portion having more resiliency than said lower portion and rigidly secured thereto and diverging therefrom, of hangers connected to the ends of said upper portions of said springs, the vehicle-body rigidly secured to said hangers and not otherwise connected to said springs, and elongated loops in the ends of both portions of the springs, all arranged and adapted to operate in the manner and for the purpose substantially as described.

In testimony whereof I affix my signature in presence of two witnesses.

DAVID W. GLIDDEN.

Witnesses:
W. A. TITSWORTH,
J. C. HARRINGTON.